US008929045B2

United States Patent
Chiang

(10) Patent No.: US 8,929,045 B2
(45) Date of Patent: Jan. 6, 2015

(54) DELAY PROTECTION CIRCUIT AND ELECTRONIC DEVICE EMPLOYING THE SAME

(75) Inventor: Cheng-Lung Chiang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 292 days.

(21) Appl. No.: 13/545,905

(22) Filed: Jul. 10, 2012

(65) Prior Publication Data

US 2013/0128403 A1 May 23, 2013

(30) Foreign Application Priority Data

Nov. 23, 2011 (TW) ................................. 100143014

(51) Int. Cl.
*H02H 3/00* (2006.01)
*H02H 3/093* (2006.01)
*H02H 3/027* (2006.01)

(52) U.S. Cl.
CPC ............... *H02H 3/093* (2013.01); *H02H 3/027* (2013.01)
USPC .......................................................... 361/94

(58) Field of Classification Search
USPC .......................................................... 361/94
See application file for complete search history.

(56) References Cited

U.S. PATENT DOCUMENTS

| | | | | |
|---|---|---|---|---|
| 6,166,669 A * | 12/2000 | Miyano | ......................... | 341/132 |
| 2005/0285819 A1* | 12/2005 | Onozawa et al. | ................ | 345/67 |
| 2008/0253052 A1* | 10/2008 | Crewson et al. | ................ | 361/98 |
| 2013/0128403 A1* | 5/2013 | Chiang | ........................... | 361/62 |
| 2014/0176031 A1* | 6/2014 | Paek et al. | ................ | 318/400.14 |

* cited by examiner

*Primary Examiner* — Ronald W Leja
(74) *Attorney, Agent, or Firm* — Novak Druce Connolly Bove + Quigg LLP

(57) ABSTRACT

A delay protection circuit is installed between a power supply unit and a load of an electronic device, and includes a first capacitor and second capacitors. The delay protection circuit allows the supply of electric power to the load by the PSU, and detects power being output by the PSU. If the power output by the PSU exceeds a rated power of the load, the first capacitor becomes chargeable by the PSU, and the load is electrically disconnected from the PSU once a voltage on the first capacitor achieves a predetermined voltage level. The second capacitors are also available for charging by the PSU according to a difference between the power being output by the PSU and the rated power of the load to provide automatic adjustability of a delay time for the voltage on the first capacitor to achieve the predetermined voltage.

14 Claims, 1 Drawing Sheet

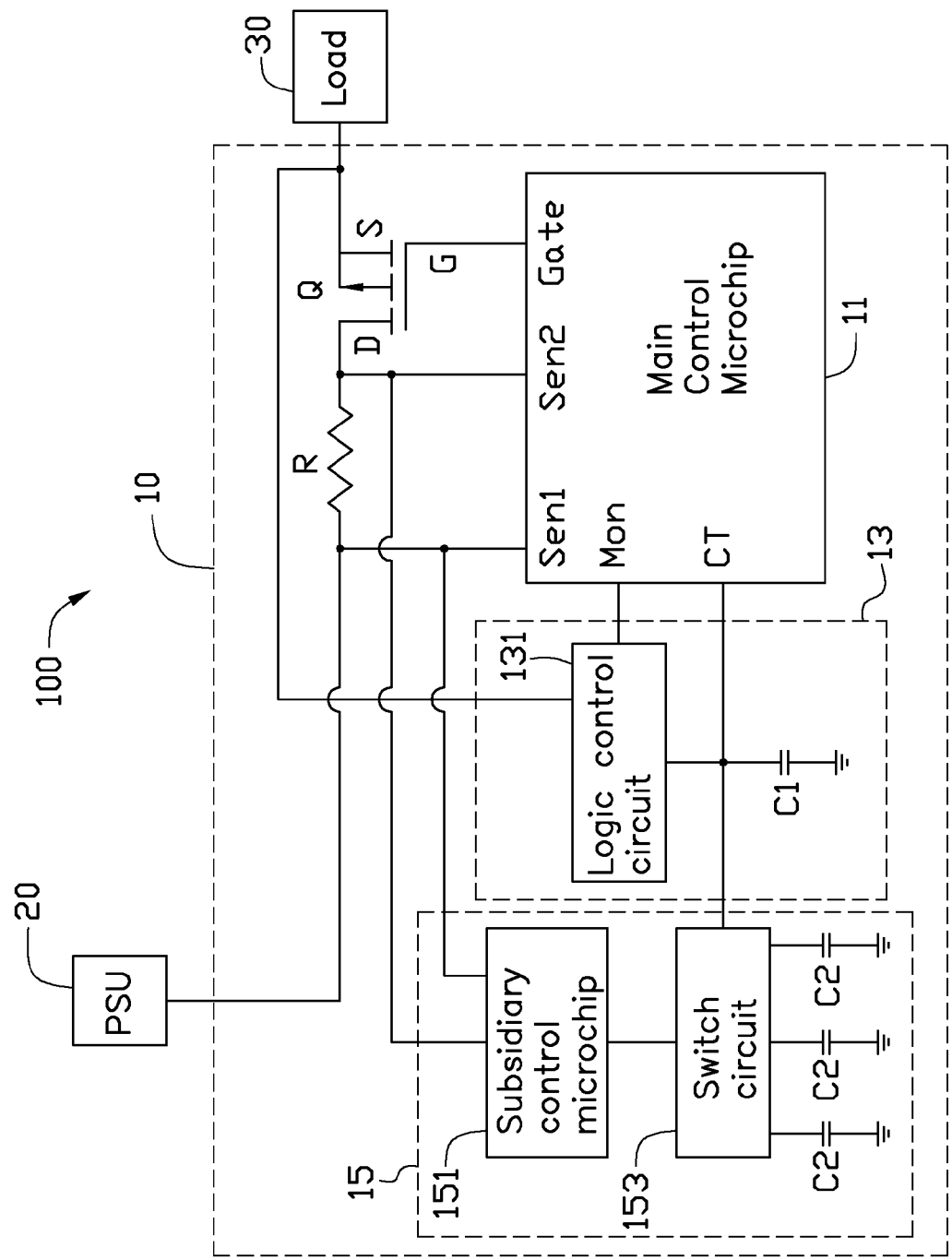

DELAY PROTECTION CIRCUIT AND ELECTRONIC DEVICE EMPLOYING THE SAME

BACKGROUND

1. Technical Field

The present disclosure relates to delay protection circuits, and particularly to a delay protection circuit with an adjustable delay time and an electronic device employing the delay protection circuit.

2. Description of Related Art

Many electronic devices employ delay protection circuits. A delay protection circuit may include a processor, a resistor, a capacitor, and a switch. When the delay protection circuit is used in an electronic device, the resistor is electrically connected to a power supply unit (PSU) of the electronic device, and the processor receives power output by the PSU via the resistor. If the power output by the PSU exceeds the rated power capacity of the electronic device, the processor controls the switch to electrically connect the capacitor with the PSU, and the PSU charges the capacitor via the switch. The processor detects a voltage on the capacitor during the charging process. Once the voltage on the capacitor achieves a predetermined and limited voltage, the processor turns off the PSU to protect the electronic device from being overpowered. The length of time for the voltage on the capacitor to achieve the predetermined voltage is identified as a delay time of the delay protection circuit. During the delay time, the electronic device can record current working processes and store data. Thus, the working processes and data are prevented from being lost when the PSU is turned off.

In the aforementioned electronic device, the delay time of the delay protection circuit cannot be adjusted. No matter how much the power output by the PSU exceeds the rated power capacity, the processor can only turn off the PSU after the fixed delay time has elapsed. If the power output by the PSU exceeds the rated power by a large margin, turning off the PSU after the delay time has elapsed may not protect the electronic device in time. Thus, the electronic device may be damaged by the excess power before the processor turns off the PSU (i.e., during the delay time). Further, if the power output by the PSU exceeds the rated power capacity only slightly, the PSU should not be turned off too quickly. This is because if the delay time is too short, the electronic device may not be able to timely store all the current working processes and data.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the figures.

The FIGURE is a circuit diagram of an electronic device having a delay protection circuit, according to an exemplary embodiment.

DETAILED DESCRIPTION

The FIGURE shows an electronic device 100, according to an exemplary embodiment. The electronic device 100 can be a personal computer (PC), a server, or another kind of data processing device. The electronic device 100 comprises a delay protection circuit 10, a power supply unit (PSU) 20, and a load 30. The load 30 can include a main board and peripheral circuits of the electronic device 100. The PSU 20 is electrically connected to the load 30 via the delay protection circuit 10. In use, the PSU 20 supplies electric power to the load 30 via the delay protection circuit 10, and the delay protection circuit 10 protects the load 30 from excess power.

The delay protection circuit 10 includes a resistor R, a transistor Q, a main control microchip 11, a delay circuit 13, and a delay time adjusting circuit 15. The transistor Q is a metal-oxide-semiconductor field-effect transistor (MOSFET), and includes a gate G, a drain D, and a source S. The resistor R is electrically connected between the PSU 20 and the drain D. The source S is electrically connected to the load 30.

The main control microchip 11 can be a TPS2456 integrated circuit (IC). The main control microchip 11 includes two detection pins Sens1 and Sens2, a gate control pin Gate, a logic control pin Mon, and a clock pin CT. The two detection pins Sens1, Sens2 are respectively electrically connected to two ends of the resistor R, and the main control microchip 11 can detect current passing through the resistor R and a voltage on the resistor R via the two detection pins Sens1, Sens2. The gate control pin Gate is electrically connected to the gate G. The main control microchip 11 can generate a gate voltage on the gate control pin Gate and outputs the gate voltage to the gate G. By adjusting the gate voltage, the transistor Q can be turned on and off by the main control microchip 11.

The delay circuit 13 includes a logic control circuit 131 and a first capacitor C1. The logic control circuit 131 and the first capacitor C1 are electrically connected in series between the source S and ground. The logic control circuit 131 can be a logic switch. The logic control pin Mon is electrically connected to the logic control circuit 131, and the main control microchip 11 can turn on and off the logic control circuit 131 using the logic control pin Mon. The clock pin CT is electrically connected between the logic control circuit 131 and the first capacitor C1.

The delay time adjusting circuit 15 includes a subsidiary control microchip 151, a switch circuit 153, and a number of second capacitors C2. The subsidiary control microchip 151 can be a micro control unit (MCU), and is electrically connected to two ends of the resistor R, to detect the current passing through the resistor R and the voltage across the resistor R. The subsidiary control microchip 151 is electrically connected to the switch circuit 153. The second capacitors C2 are all electrically connected in parallel between the switch circuit 153 and ground, and the switch circuit 153 is electrically connected between the logic control circuit 131 and the first capacitor C1. The subsidiary control microchip 151 can control the switch circuit 153 to electrically connect any one or more of the second capacitors C2 between the logic control circuit 131 and ground, that is, to electrically connect the first capacitor C1 and any one or more of the second capacitors C2 in parallel between the logic control circuit 131 and ground.

When the electronic device 100 is being used, the main control microchip 11 turns on the transistor Q. The drain D is electrically connected to the source S, and the PSU 20 supplies power to the load 30 via the resistor R, the drain D, and the source S. Both the main control chip 11 and the subsidiary control microchip 151 immediately detect the current passing through the resistor R and the voltage across the resistor R, and calculate the power being output by the PSU 20 according to the current and voltage values detected.

If the quantity of power output by the PSU 20 exceeds the rated power of the load 30, the main control microchip 11 turns on the logic control circuit 131 using the logic control pin Mon. The PSU 20 is then electrically connected to the first capacitor C1 via the resistor R, the drain D, the source S, and the logic control circuit 131, and begins to charge the first capacitor C1. During the charging process, the main control microchip 11 detects a voltage on the first capacitor C1 using the clock pin CT. Once the voltage on the first capacitor C1 achieves a predetermined voltage, the main control microchip 11 prevents the PSU 20 from supplying electric power to the load 30 and protects the load 30 from excess power by turning off the transistor Q. A time for the voltage on the first capacitor C1 to achieve the predetermined voltage is identified as a delay time of the delay protection circuit 10. During the delay time, the load 30 can record current working processes and store data.

Upon detecting that the power output by the PSU 20 exceeds a rated power of the load 30, the subsidiary control microchip 151 determines whether or not to electrically connect any of the second capacitors C2 between the logic control circuit 131 and ground, according to a difference between the power output by the PSU 20 and the rated power. If the power output by the PSU 20 does not exceed the rated power by more than a preset threshold quantity, the subsidiary control microchip 151 controls the switch circuit 153 to electrically connect one or more of the second capacitors C2 between the logic control circuit 131 and ground. Thus, the first capacitor C1 and the one or more second capacitor(s) C2 are electrically connected in parallel between the logic control circuit 131 and ground, requiring the PSU 20 to also charge the one or more second capacitor(s) C2.

According to inherent characteristics of capacitors, a total capacitance existing between the PSU 20 and ground is a sum of capacitances of the first capacitor C1 and the one or more second capacitor(s) C2. Since the PSU 20 now needs to charge the (larger) combination of the first capacitor C1 and the one or more second capacitor(s) C2, a voltage on the first capacitor C1 needs more time to achieve the predetermined voltage. In this way, the delay time of the delay protection circuit 10 is extended, which should enable the load 30 to complete the storage of all working processes and data before the transistor Q is turned off.

In the electronic device 100, the smaller the difference between the (larger) power being output by the PSU 20 and the (smaller) rated power of the load 30, the smaller the danger of the load 30 being damaged by excess power. Thus, a longer, adjustable total delay time is available, by connecting one or more of the second capacitors C2 to the logic control circuit 131. In this embodiment, the subsidiary control microchip 151 determines whether any of the second capacitors C2 is to be electrically connected to the logic control circuit 131, and if applicable the number of second capacitors C2 to be electrically connected to the logic control circuit 131, according to the difference between the quantity of power being output by the PSU 20 and the rated power. Thereby, the subsidiary control microchip 151 can automatically adjust the delay time.

For example, when the difference between the power output by the PSU 20 and the rated power is less than 50 W (watts), the subsidiary control microchip 151 controls the switch circuit 153 to electrically connect three second capacitors C2 between the logic control circuit 131 and ground, thereby obtaining the longest possible delay time. When the difference between the power output by the PSU 20 and the rated power is in the range from 50 W to less than 100 W, the subsidiary control microchip 151 controls the switch circuit 153 to electrically connect two second capacitors C2 between the logic control circuit 131 and ground, thereby obtaining a shorter delay time. When the difference between the power output by the PSU 20 and the rated power is in the range from 100 W to less than 150 W, the subsidiary control microchip 151 controls the switch circuit 153 to electrically connect one second capacitor C2 between the logic control circuit 131 and ground, thereby obtaining an even shorter delay time. When the difference between the power output by the PSU 20 and the rated power is equal to or more than 150 W, the subsidiary control microchip 151 turns off the switch circuit 153, and none of the second capacitor C2 is electrically connected between the logic control circuit 131 and ground, thereby obtaining the shortest possible delay time.

In summary, when the power being output by the PSU 20 exceeds the rated power of the load 30, the delay protection circuit 10 applies the aforementioned delay time. The current working processes and data of the load 30 can be completely stored during the delay time, and then the delay protection circuit 10 electrically disconnects the load 30 from the PSU 20 after the end (expiry) of the delay time to protect the load 30 from excess power. Furthermore, according to the above-described means and methods, the delay time of the delay protection circuit 10 is adjustable. If the power output by the PSU 20 greatly exceeds the rated power, the delay protection circuit 10 shortens the delay time and thereby achieves a quick electrical disconnection of the load 30 from the PSU 20. If the power output by the PSU 20 exceeds the rated power by only a small quantity, the delay protection circuit 10 extends the delay time, such that there is more opportunity to store all working processes and data before the load 30 is electrically disconnected from the PSU 20.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A delay protection circuit for an electronic device, the delay protection circuit electrically connected between a power supply unit (PSU) of the electronic device and a load of the electronic device, and the delay protection circuit comprising:

a main control microchip;

a delay circuit electrically connected to the main control microchip, the delay circuit including a first capacitor; and a delay time adjusting circuit electrically connected to the delay circuit, the delay time adjusting circuit including a plurality of second capacitors;

wherein the main control microchip electrically connects the PSU to the load to supply electric power to the load using the PSU, and both the main control microchip and the delay time adjusting circuit detect power output by the PSU;

in response to detecting that the power output by the PSU exceeds a rated power of the load, the main control microchip electrically connects the first capacitor to the PSU to charge the first capacitor using the PSU, and electrically disconnects the load from the PSU once a voltage on the first capacitor achieves a predetermined protection voltage, and the delay time adjusting circuit electrically connects any one or more of the second capacitors to the PSU according to a difference between the power output by the PSU and the rated power to adjust a delay time for the voltage on the first capacitor to achieve the protection voltage.

2. The delay protection circuit of claim 1, further comprising a resistor electrically connected between the PSU and the load; wherein both the main control microchip and the delay time adjusting circuit are electrically connected to the resistor to detect the power output by the PSU.

3. The delay protection circuit of claim 2, further comprising a transistor; wherein the transistor is a metal-oxide-semiconductor field-effect transistor (MOSFET) and includes a gate, a drain, and a source, the resistor is electrically connected between the PSU and the drain, the source is electrically connected to the load, and the main control microchip is electrically connected to the gate to turn on and off the transistor, thereby electrically connecting the PSU to the load and disconnecting the PSU from the load.

4. The delay protection circuit of claim 3, wherein the delay circuit further includes a logic control circuit, the logic control circuit and the first capacitor are electrically connected in series between the source and ground, and the main control microchip is electrically connected to the logic control circuit and controls the logic control circuit to electrically connect the first capacitor to the source and disconnect the first capacitor from the source.

5. The delay protection circuit of claim 4, wherein the delay time adjusting circuit further includes a subsidiary control microchip and a switch circuit; the subsidiary control microchip is electrically connected to the resistor to detect the power output by the PSU, and is further electrically connected to the switch circuit to turn on and off the switch circuit; the second capacitors are all electrically connected in parallel between the switch circuit and ground; and the switch circuit is electrically connected between the logic control circuit and the first capacitor.

6. The delay protection of in claim 5, wherein when the difference between the power output by the PSU and the rated power is respectively in a first range, a second range, a third range, and a fourth range, the subsidiary control microchip respectively controls the switch circuit to electrically connect three, two, one, and no second capacitor(s) between the logic control circuit and ground, thereby respectively obtaining different delay times for the voltage on the first capacitor achieving the protection voltage.

7. The delay protection circuit of claim 6, wherein the first, second, third, and fourth ranges of the difference between the power output by the PSU and the rated power are respectively less than 50 W, from 50 W to less than 100 W, from 100 W to less than 150 W, and 150 W or more.

8. An electronic device, comprising:
a load;
a power supply unit (PSU); and
a delay protection circuit electrically connected between the PSU and the load, the delay protection circuit comprising:
a main control microchip;
a delay circuit electrically connected to the main control microchip, the delay circuit including a first capacitor; and
a delay time adjusting circuit electrically connected to the delay circuit, the delay time adjusting circuit including a plurality of second capacitors;

wherein the main control microchip electrically connects the PSU to the load to supply electric power to the load using the PSU, and both the main control microchip and the delay time adjusting circuit detect power output by the PSU;
in response to detecting that the power output by the PSU exceeds a rated power of the load, the main control microchip electrically connects the first capacitor to the PSU to charge the first capacitor using the PSU, and electrically disconnects the load from the PSU once a voltage on the first capacitor achieves a predetermined protection voltage, and
the delay time adjusting circuit electrically connects any one or more of the second capacitors to the PSU according to a difference between the power output by the PSU and the rated power to adjust a delay time for the voltage on the first capacitor to achieve the protection voltage.

9. The electronic device of claim 8, wherein the delay protection circuit further comprises a resistor electrically connected between the PSU and the load, and both the main control microchip and the delay time adjusting circuit are electrically connected to the resistor to detect the power output by the PSU.

10. The electronic device of claim 9, wherein the delay protection circuit further comprises a transistor; the transistor is a metal-oxide-semiconductor field-effect transistor (MOSFET) and includes a gate, a drain, and a source, the resistor is electrically connected between the PSU and the drain, the source is electrically connected to the load, and the main control microchip is electrically connected to the gate to turn on and off the transistor, thereby electrically connecting the PSU to the load and disconnecting the PSU from the load.

11. The electronic device of claim 10, wherein the delay circuit further includes a logic control circuit, the logic control circuit and the first capacitor are electrically connected in series between the source and ground, and the main control microchip is electrically connected to the logic control circuit and controls the logic control circuit to electrically connect the first capacitor to the source and disconnect the first capacitor from the source.

12. The electronic device of claim 11, wherein the delay time adjusting circuit further includes a subsidiary control microchip and a switch circuit; the subsidiary control microchip is electrically connected to the resistor to detect the power output by the PSU, and is further electrically connected to the switch circuit to turn on and off the switch circuit; the second capacitors are all electrically connected in parallel between the switch circuit and ground; and the switch circuit is electrically connected between the logic control circuit and the first capacitor.

13. The electronic device of claim 12, wherein when the difference between the power output by the PSU and the rated power is respectively in a first range, a second range, a third range, and a fourth range, the subsidiary control microchip respectively controls the switch circuit to electrically connect three, two, one, and no second capacitor(s) between the logic control circuit and ground, thereby respectively obtaining different delay times for the voltage on the first capacitor achieving the protection voltage.

14. The electronic device of claim 13, wherein the first, second, third, and fourth ranges of the difference between the power output by the PSU and the rated power are respectively less than 50 W, from 50 W to less than 100 W, from 100 W to less than 150 W, and 150 W or more.

* * * * *